United States Patent [19]

Levine et al.

[11] Patent Number: 4,852,293
[45] Date of Patent: Aug. 1, 1989

[54] FISHING ACCESSORY CONTAINER

[75] Inventors: Lance R. Levine; Clarence A. Pratt, Jr., both of El Paso, Tex.

[73] Assignee: MFI International, Inc., El Paso, Tex.

[21] Appl. No.: 199,058

[22] Filed: May 26, 1988

[51] Int. Cl.⁴ .............................................. A01K 97/06
[52] U.S. Cl. .................... 43/54.1; 43/57.1; 43/57.2; 43/26; 190/110; 190/118
[58] Field of Search ............ 43/54.1, 57.1, 57.2; 190/110, 111, 109, 118, 117, 119, 900; 206/315.11

[56] References Cited

U.S. PATENT DOCUMENTS

| | | | |
|---|---|---|---|
| 1,076,894 | 10/1913 | Langbein | 43/57.1 |
| 1,979,475 | 10/1934 | Knettles | 43/57.2 |
| 3,181,751 | 6/1963 | Wilson . | |
| 3,537,628 | 11/1970 | Thompson . | |
| 4,372,073 | 2/1983 | Goldman | 43/57.1 |
| 4,389,806 | 6/1983 | Herring . | |
| 4,467,551 | 8/1984 | Pulver . | |
| 4,703,581 | 10/1987 | Whittier | 43/57.1 |
| 4,708,243 | 10/1987 | Nailon | 206/315.11 |
| 4,756,394 | 7/1988 | Cohen | 190/110 |

Primary Examiner—Nicholas P. Godici
Assistant Examiner—Michael William Starkweather
Attorney, Agent, or Firm—Charles D. Gunter, Jr.

[57] ABSTRACT

A fishing accessory container is shown which includes a flexible outer bag having a left and right halves which meet along a peripheral edge. A zipper joins the left and right halves along the peripheral edge to define a closed interior for the bag. A plurality of removable inserts are located within the bag interior and can be unzipped and removed from the bag interior to allow the user to select only needed equipment to be carried on a particular occasion.

2 Claims, 3 Drawing Sheets

FISHING ACCESSORY CONTAINER

BACKGROUND OF THE INVENTION

1. Field of the Invention

This invention relates to fishing gear generally and, specifically, to a bag for containing fishing lures and fishing accessories.

2. Description of the Prior Art

Artificial fishing lures have achieved increased popularity in recent years. The term "lures" in this discussion is meant to encompass artificial worms, spinner baits, plugs jigs, spoons and the like. Artificial lures eliminate the need to keep live bait live and eliminate the need for transporting aerators, live bait tanks, and other life support equipment. Artificial lures also come in a wide variety of shapes, colors and designs for every conceivable fishing condition.

In spite of the many advantages of artificial lures, there are problems associated with their transportation and use. Once concern is to provide a storage capacity which enables the user to always have his lures at hand when fishing. If a fisherman has only a few lures, the lures can be stored easily enough in a tackle box. However, if a fisherman has a large number of lures, he must either purchase a large number of tackle boxes or stuff a large number of lures into a box which is not designed to accommodate them.

Even with a large number of boxes, the fisherman must carry all of the boxes about or find adequate storage space on his boat. If all of the lures are carried in one large box, they frequently become entangled. Untangling the lures wastes valuable fishing time and can be very frustrating.

The present invention provides a novel apparatus for storing a variety of fishing lures and accessories including hooks, corks and weights. The apparatus of the invention provides a convenient means for storing lures and makes the lures easily accessible. Separate storage is provided for individual lures or for lures of similar type of color. The apparatus stores lures in a small amount of space and selection of a desired lure color or style is facilitated.

The storage apparatus of the invention is simple in design and inexpensive to manufacture. The apparatus is durable in construction and has a long useful life.

Other benefits and advantages of the novel fishing lure storage container will be apparent in the following written description and accompanying drawings.

SUMMARY OF THE INVENTION

The fishing accessory container includes a flexible outer bag made up of left and right halves adapted to meet along a peripheral edge. Closure means are provided for joining the left and right halves along the peripheral edge to thereby define a closed interior for the flexible outer bag. A plurality of removable inserts are located within the closed interior of the outer bag and are accessible by unjoining the closure means. Each insert has a top and bottom edge separated by opposing side edges. The bottom edge of the selected insert is provided with attachment means for removably attaching the selected inserts within the closed interior. Each insert has an exterior and an interior for holding fishing accessories. Preferably, each of the inserts are formed of a transparent material and are provided with a plurality of pockets for holding fishing accessories. The bottom edge of each insert is provided with a zipper part for engaging a mating zipper part provided along a bottom extent within the interior of the bag. Each insert is arranged in the bag interior with its insert zipper running parallel to the next adjacent insert zipper on the bottom extent of the bag, whereby the removable inserts lie side-by-side in the bag interior when the bag is closed and whereby the inserts can be turned in page-like fashion when the outer bag is open.

DETAILED DESCRIPTION OF THE INVENTION

Figure 1:
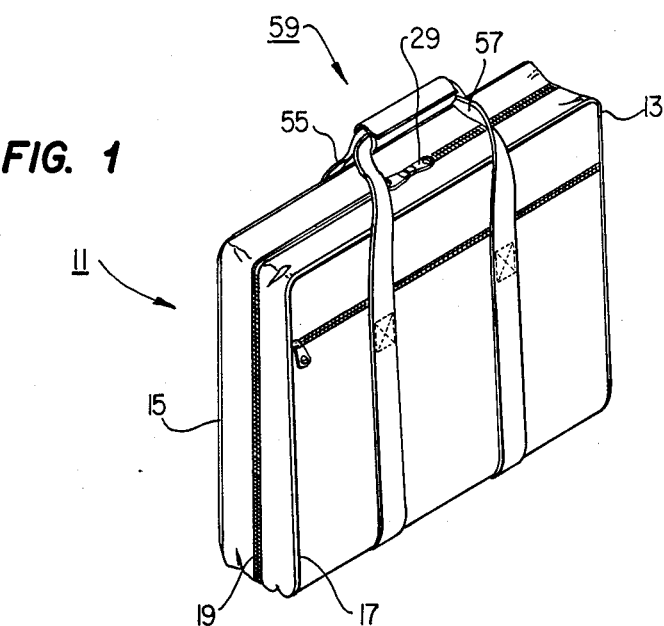
FIG. 1 is a perspective view of the fishing accessory container of the invention, the left and right halves of the bag being closed.
Figure 2:
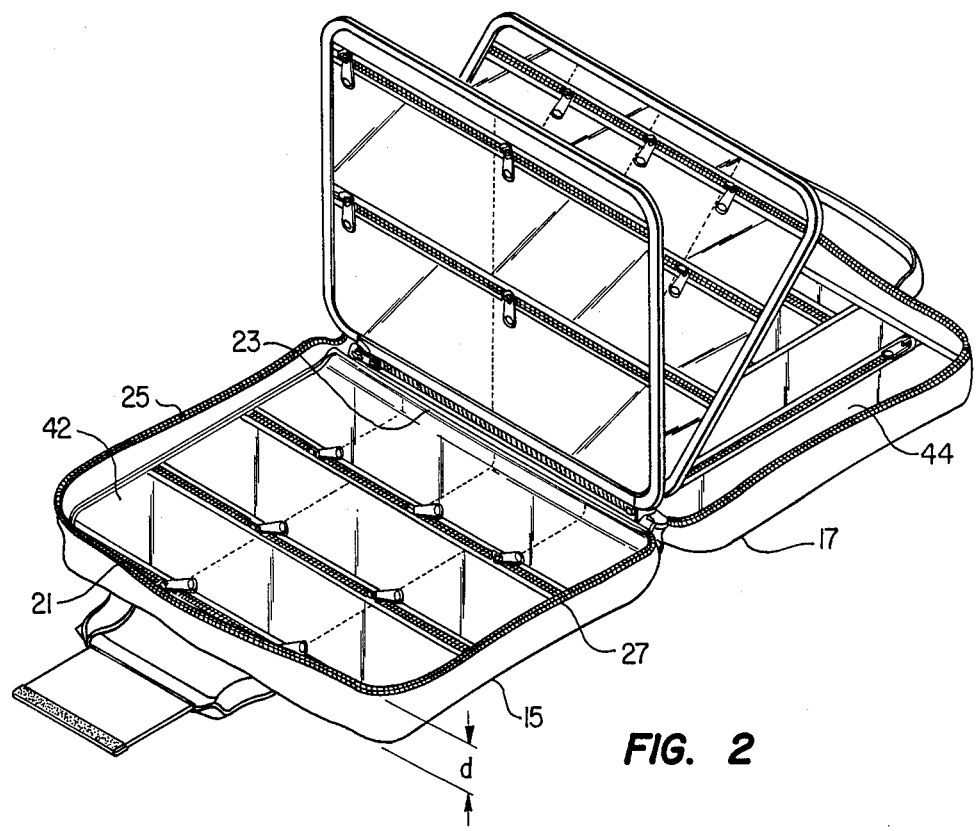
FIG. 2 is a perspective view of the container of the invention showing the removable inserts being turned in page-like fashion.

FIG. 1 shows a fishing accessory container of the invention designated generally as 11. As shown in FIGS. 1 and 2, the container 11 is made up of a flexible outer bag 13 having left and right halves 15,17 which are adapted to meet along a peripheral edge 19. The bag halves are preferably made from a water repellant cloth or vinyl material. The peripheral edge 19 of each half of the bag 13 is defined by a top and bottom extent 21,23, separated by opposing side extents 25,27 (see FIG. 2). Each half 15,17 is generally rectangular in shape and has an interior depth "d". An external zipper 29 joins the left and right halves 15,17 together along a portion of the peripheral edge 19 to define a closed interior for the flexible outer bag. The external zipper 29 extends along the top and side extents 21,25,27, respectively, of each half of the outer bag. The bottom extent 23 of each half of the bag is permanently joined, as by sewing.

Figure 3:
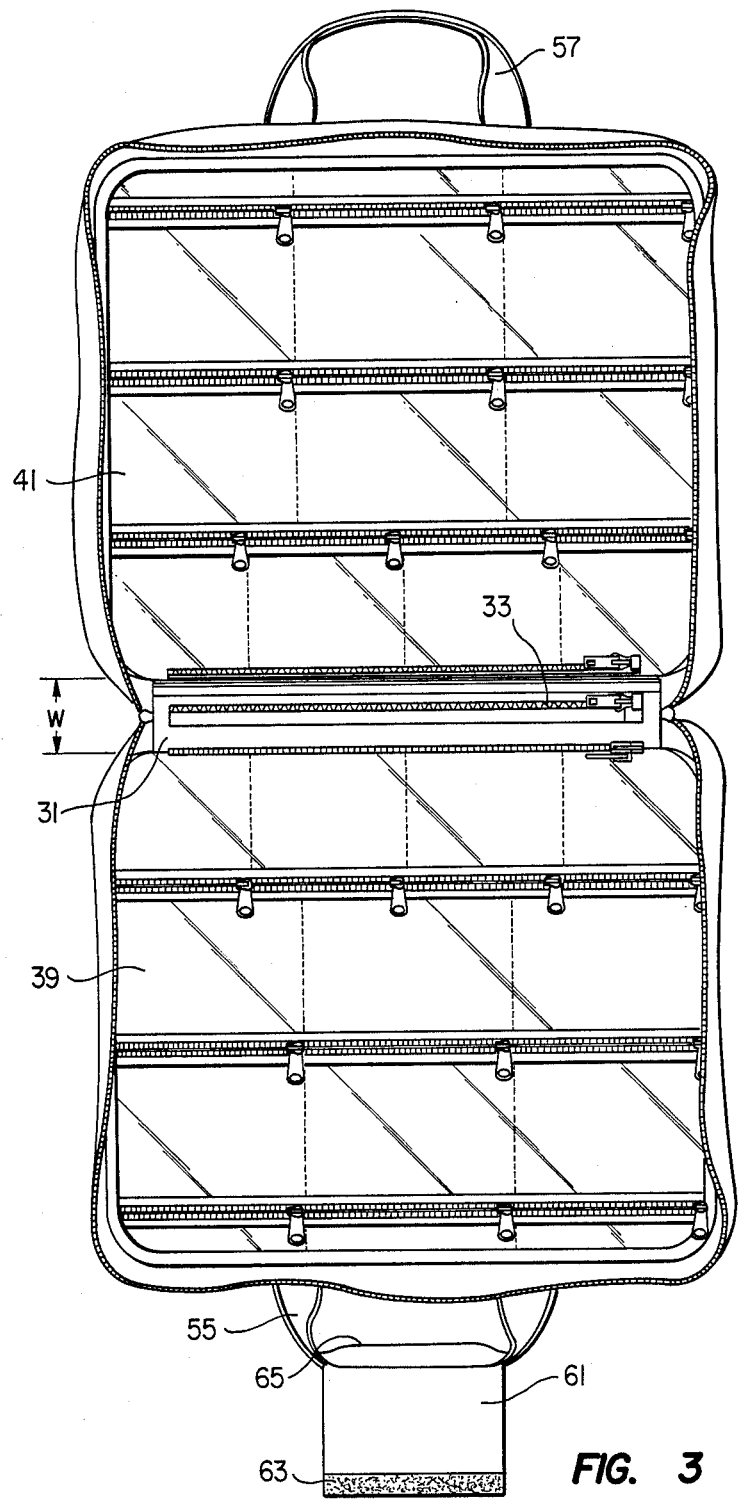
FIG. 3 is a top view of the container of the invention with the left and right halves of the bag being open.

By sewing the bottom extents 23 of the bag halves together, a flat panel 31 is formed within the interior of the bag having a length and a width "w" (see FIG. 3). This generally rectangular panel forms a zipper holding region for mounting zipper parts 33. Each zipper part 33 is adapted to engage a mating zipper part 35 (FIG. 4) of a removable insert 37. Preferably, a plurality of removable inserts are located within the closed interior of the bag and are accessible by unzipping the external zipper 29. In FIG. 3, removable inserts 39,41 are engaging their respective zipper parts located on the interior panel 31 while removable insert 37 has been unzipped from zipper part 33. A transparent plastic insert (42,44 in FIG. 2) can also be permanently sewn to the interior sidewall of each half 15,17 of the bag for storing accessories.

Figure 5:
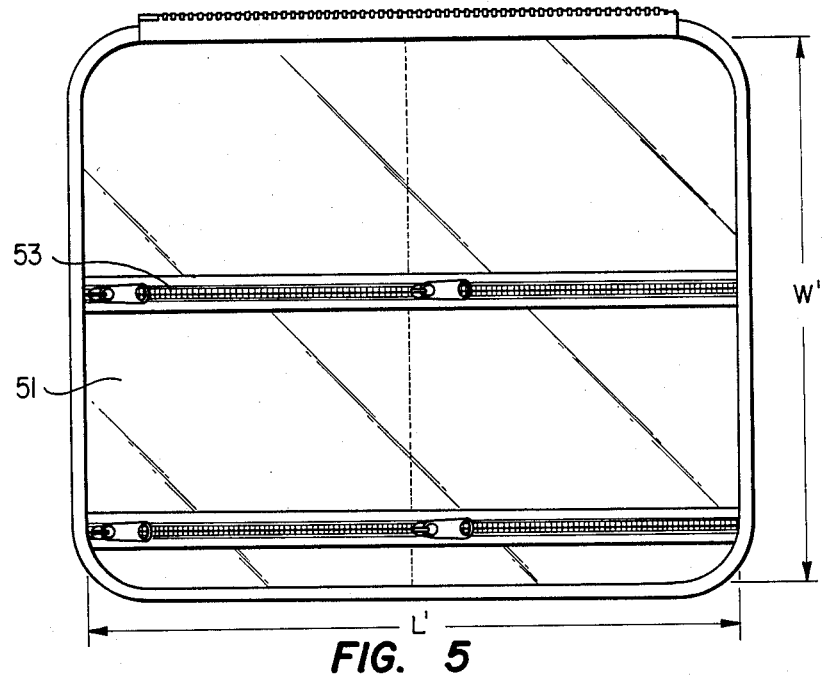
FIG. 5 is an isolated view of another of the removable inserts of the invention.
Figure 4:
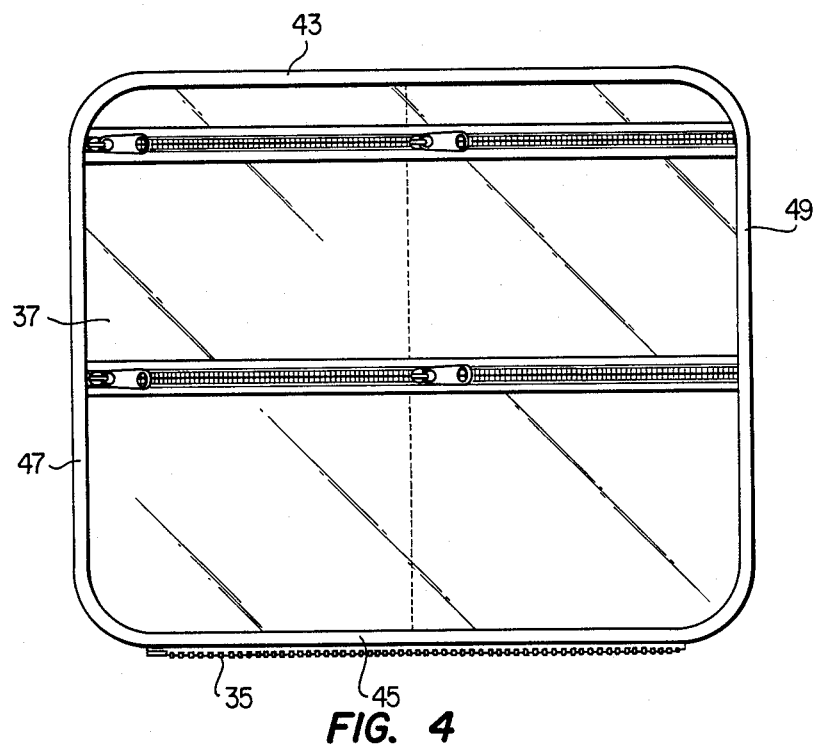
FIG. 4 is an isolated view of one of the removable inserts of the invention.

As shown in FIG. 4, each insert 37 has top and bottom edges 43,45 separated for opposing side edges 47,49. The bottom edge 45 of selected inserts is provided with the zipper part 35 for engaging the mating zipper part 33 provided along the panel 31 formed by the bag bottom extents 23. Each insert is preferably formed from a transparent material, such as a suitable plastic, and has a plurality of pockets 51 (FIG. 5), each pocket being accessible by means of a pocket zipper 53.

Each insert has a length "l'" and a width "w'" which define a front planar surface area and a rear planar surface area, the planar surface areas being separated by a generally uniform thickness, the thickness of each insert being less than ¼ the width thereof.

As best seen in FIG. 3, each insert 37 is preferably arranged in the bag interior with its insert zipper running parallel to the next adjacent insert zipper on the bottom panel 31, whereby the removable inserts lie side-by-side in the bag interior when the external zipper 29 is zipped, and whereby the inserts 37 can be turned in page-like fashion when the outer bag is open.

As seen in FIGS. 1 and 3, the outer flexible bag 13 is provided with a handle loop 55,57 which is sewn on the exterior thereof and which extends from the top extent of each half 15,17. A wrap-around closure 59 connects the handle loops during transport of the bag. The closure 59 includes a flap 61 secured to the handle 55. The flap has a VELCRO strip 63 at the outer extent thereof for engaging a mating VELCRO strip 65 located on the rear surface of the handle grip 65, as shown in FIG. 3. The mating strips are provided with VELCRO loops and hooks, respectively, for engaging the surface 63,65 upon contact, as will be familiar to those skilled in the fabric arts. To close the bag, the flap 61 is wrapped around the handle 57 and the strips 63,65 are engaged, as shown in FIG. 1.

An invention has been provided with several advantages. The fishing accessory container of the invention is simple in design and inexpensive to manufacture and yet provides a convenient apparatus for storing and using fishing tackle. Because of the flexible nature of the outer bag, it can be placed or stored in small and confined spaces. The container of the invention provides a plurality of removable inserts, each of which has a number of pockets for holding and segregating tackle. Because the inserts are formed of transparent plastic, the contents of the pockets are easily discerned. Selected inserts can be removed from the bag by unzipping a zipper provided along a bottom edge of the insert. This allows the fisherman to store a large number of accessories in the bag but to choose only selected accessories to be carried during actual use. Alternatively, the fisherman can store all of his tackle in the inserts in, for example, a closet and only place two or three inserts in to the flexible bag for use on a particular occasion.

While the invention has been described in only one of its forms, it is not thus limited but is susceptible to various changes and modifications without departing from the spirit thereof.

I claim:

1. A fishing accessory container, comprising:
 a flexible outer bag made up of left and right halves adapted to meet along a peripheral edge, the peripheral edge of each half of the outer bag being defined by a top and bottom extent which is separated by opposing side extents;
 an external zipper for joining the left and right halves along the peripheral edge to thereby define a closed interior for the flexible outer bag, the external zipper extending along at least the side and top extents of each half of the outer bag, the bottom extent of the halves also being joined together;
 a plurality of removable inserts located within the closed interior of the bag and being accessible by unzipping the external zipper, each insert having top and bottom edges separated by opposing side edges, the bottom edge of selected inserts being provided with a zipper part which extends substantially along the entire length of the bottom edge for removably engaging a mating zipper part provided along the bottom extent of the flexible outer bag, each insert having an exterior and an interior for holding fishing accessories and each insert being arranged in the bag interior with its insert zipper running parallel to the next adjacent insert zipper on the bottom extent of the flexible outer bag, whereby the inserts lie side-by-side in the bag interior when the external zipper is zipped, whereby the inserts can be turned in page-like fashion when the outer bag is open; and
 wherein the interior of each insert is divided into a plurality of pockets, each pocket being accessibly by means of a pocket opening.

2. A fishing accessory container, comprising:
 a flexible outer bag made up of left and right halves adapted to meet along a peripheral edge, the peripheral edge of each half of the outer bag being defined by a top and bottom extent which is separated by opposing side extents;
 an external zipper for joining the left and right halves along the peripheral edge to thereby define a closed interior for the flexible outer bag, the external zipper extending along at least the side and top extents of each half of the outer bag, the bottom extent of the halves also being joined together;
 a plurality of removable inserts located within the closed interior of the bag and being accessible by unzipping the external zipper, each insert having top and bottom edges separated by opposing side edges, the bottom edge of selected inserts being provided with a zipper part which extends substantially along the entire length of the bottom edge for removably engaging a mating zipper part provided along the bottom extent of the flexible outer bag, each insert being formed of a transparent material and having an interior for holding fishing accessories;
 each insert being arranged in the bag interior with its insert zipper running parallel to the next adjacent insert zipper on the bottom extent of the flexible outer bag, whereby the removable inserts lie side-by-side in the bag interior when the external zipper is zipped, and whereby the inserts can be turned in page-like fashion when the outer bag is open, the interior of each insert being divided into a plurality of pockets, each pocket being accessible by means of a pocket zipper; and
 wherein each of the left and right bag halves within the closed interior has an insert formed of a transparent material and permanently affixed thereto, each of the permanent inserts having a plurality of pockets, each of which is accessible by means of a pocket zipper.

* * * * *